Patented July 11, 1933

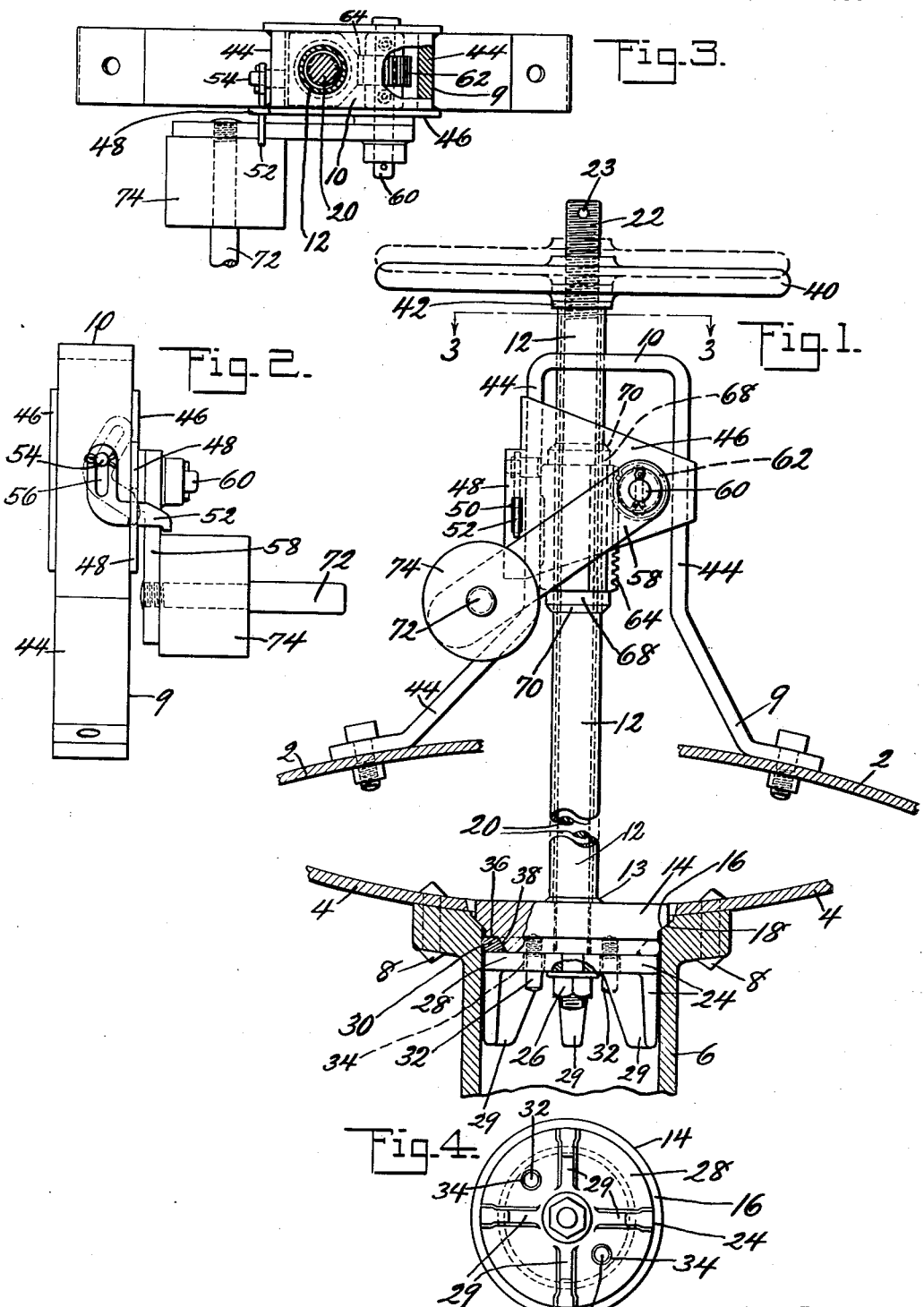

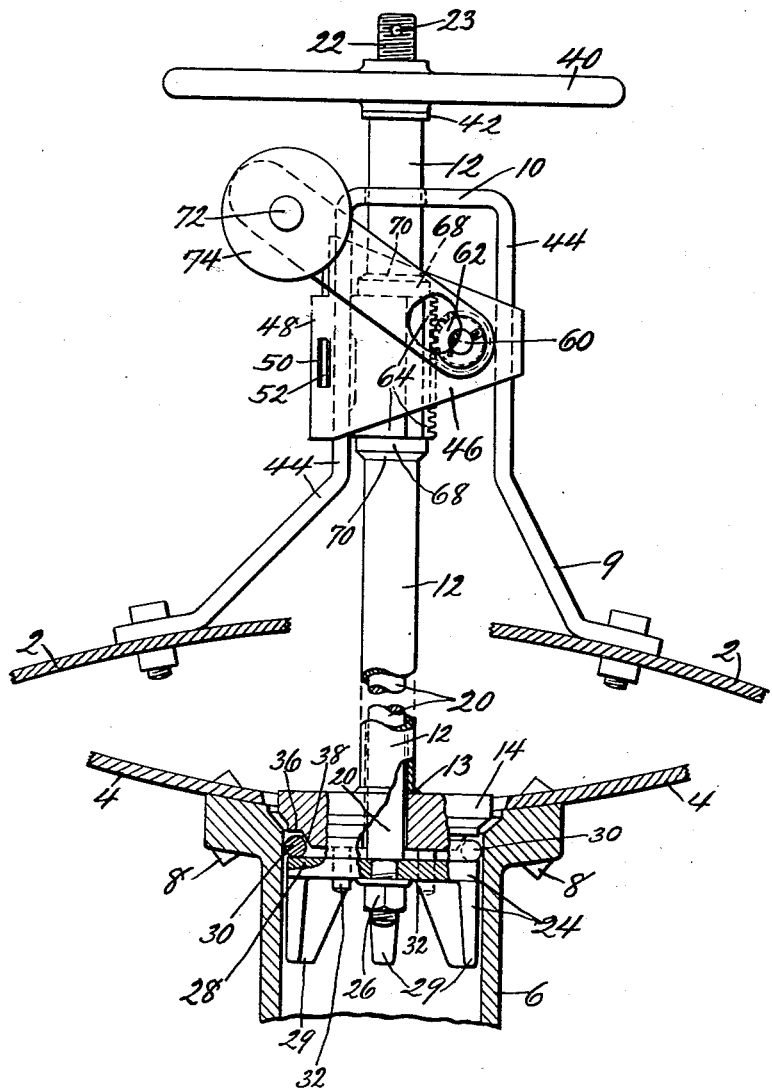

1,917,936

UNITED STATES PATENT OFFICE

EDWARD M. HARTMAN, OF MILTON, PENNSYLVANIA, ASSIGNOR TO AMERICAN CAR AND FOUNDRY COMPANY, OF NEW YORK, N. Y., A CORPORATION OF NEW JERSEY

VALVE AND OPERATING MEANS THEREFOR

Application filed February 12, 1932. Serial No. 592,484.

This invention relates generally to valves and is directed to valves adapted particularly for use with car tanks though of course the construction is applicable to bottom discharge containers generally.

One object of this invention is the provision of a new and improved valve for car tanks.

Another object of this invention is the provision of a valve and operating means therefor for controlling discharge of lading from the outlet of a car tank or other container.

Still another object of this invention is the provision of a multi-part valve for controlling discharge of lading from a car tank and wherein provision is made for sealing the discharge outlet against leakage in the event of improper seating of the valve.

A further object of this invention is the provision of a multi-part valve having a gasket arranged between the said parts for sealing the discharge outlet against leakage, and operating means for the valve embodying independently movable elements.

A still further object of this invention is to provide a discharge valve and operating means therefor adapted particularly for use for controlling discharge of lading from a car tank, said valve and operating means being easy and inexpensive to manufacture, and strong and durable in operation.

Other objects and advantages of this invention will be apparent from the following description taken in conjunction with the accompanying drawings in which:

Figure 1 is a front view of the device of the present invention showing the same applied to a car tank, portions of the latter being shown in section, and portions of the valve being also sectioned;

Fig. 2 is a side view of the bracket forming a part of the invention, the view also showing the lever associated therewith;

Fig. 3 is a sectional view on the line 3—3, Fig. 1;

Fig. 4 is an inverted plan view of the valve body and guide, and

Fig. 5 is a front elevation of the device of the present invention applied to a car tank, the view showing the valve lifted from its seat, certain parts in the view being shown in section.

In the drawings, portions of the top and bottom walls of a tank are shown at 2 and 4 respectively, the latter having a discharge outlet 6 secured thereto by suitable fasteners 8. The present invention is designed particularly for use with railway car tanks and the portion 2 of the tank may be within the usual tank dome (not shown) whereby the valve operating means may be covered by a dome cover. It is to be understood, however, that this invention is not restricted in its use to car tanks.

The tank portion 2 supports a bracket indicated generally at 9, the bracket being of substantially inverted flanged U-shape, the cross-bar 10 of which serves as a guide for a tubular valve rod 12 connected at its lower end as by the being welded at 13 to a valve body 14 having a beveled seating surface 16 normally resting on valve seat 18 formed, in the instance shown, on the upper end of the discharge outlet 6. The valve body 14 forms one of the parts of the multi-part valve as will be hereinafter more clearly pointed out.

The valve rod 12 extends upwardly beyond the cross-bar 10 and retains a valve guide controller 20 comprising a rod having its upper end threaded as at 22 and projected beyond the upper end of the tubular valve rod 12. The controller 20 has its lower end extended through an opening in the valve body 14 and through a valve guide indicated generally at 24 and the lower end of said controller 20 carries a nut 26 to support the guide 24.

As clearly shown, the guide 24 comprises a disc 28 having radial wings 29 on its lower surface, the guide being of such diameter as to fit within the discharge outlet 6. The guide supports a compressible gasket 30 and is restrained against rotation relative to the valve body 14 by pins 32 projecting downwardly from the valve body into openings 34 formed in the disc 28.

The guide 24 is movable vertically relative to the valve body 14, as hereinafter more clearly described, to compress the gasket 30 between the body and guide, and against the inner surface of the discharge outlet (see Fig. 1), the lower portion of the valve body 14 being reduced in diameter to provide an annular recess defined by the angularly arranged shoulders 36 and 38 against which the gasket fits when compressed.

The guide 24 and the valve body 14 are retained in assembled relation by means of a hand-wheel 40 rotatably mounted on the threaded upper end of the controller 20, the hub 42 of the wheel normally resting on the upper end of the valve rod 12 which constitutes a seat for the wheel whereby said wheel and controller 20 are supported. Unless the gasket 30 is stuck to either the discharge outlet or the valve body, it will be obvious that rotation of the wheel 40 in one direction on the upper end of the valve rod 12 will result in a lowering movement of the controller 20 in the valve rod 12 and a consequent lowering of the guide 24 relative to the valve body 14 which will relieve the gasket 30 of compression and break the seal between said gasket and the discharge outlet. Such operation, it will be obvious, does not affect the valve body 14 as during rotation of the wheel 40 the valve body 14 remains on its seat 18. Reversal of movement of the hand-wheel will obviously compress the gasket and the parts will be assembled as shown in Fig. 1. It frequently happens, however, that the gasket adheres to the discharge outlet or to the valve body or perhaps to both and in this event, rotation of the hand-wheel 40 in one direction, instead of causing a lowering movement of the controller 20, will result in the hand-wheel riding upwardly on the threaded end of the controller as shown in broken lines in Fig. 1. Separation of the valve body 14, guide 24, and the gasket 30 will then be effected during operation of the valve body as presently to be described. The upper end of the controller 20 is provided with a pin 23 to prevent complete removal of the hand-wheel 40 from said controller.

The bracket 9 includes the arms 44 which constitute supporting elements for a yoke 46 secured thereto and, in the instance shown, embracing the arms; the yoke including spaced walls, one of which is provided with a rearward extension 48 having a slot 50 therein through which a latch 52 normally projects. As clearly shown in Fig. 2, the latch 52 is supported by one of the arms 44 of the bracket 9, said arm carrying a pin 54 which extends through a slot 56 formed in the rear end of the latch 52. The lower end of the slot 50 in the extension 48 of the yoke 46 forms a support for the latch 52 (see Figs. 1 and 2) and said latch normally extends over a lever 58 connected at one end to a pin 60 journaled in the spaced walls of the yoke 46 and carrying a pinion 62 in meshing relation with a rack 64 arranged on the valve rod 12 and adapted, upon movement of the valve rod 12, to be guided between the walls of the yoke as will be apparent from Fig. 3. While the rack 64 may be secured to the valve rod 12 if desired, the drawings show the rack as being arranged between upper and lower collars 68 welded to the valve rod 12 as at 70; the lower collar 68 serving as a support for the rack 64 as will be obvious.

The free end of the lever 58 is provided with a handle 72 carrying a weight 74 which normally urges the valve rod 12 to lowered position whereby to urge the valve body 14 to its seated position when said lever is on one side of a vertical plane coincident with the axis of rotation of the pinion 62. When the lever is swung on its pivot pin 60 to the opposite side of the vertical plane coincident with the axis of rotation of the pinion 62, the weighted lever tends to hold the valve body in elevated position or away from its valve seat 18. It will be obvious that the upper collar 68 serves to limit upward movement of the valve rod 12 by contacting with the under surface of the cross-bar 10.

As before mentioned, in case the gasket 30 is stuck to either the valve body 14 or the discharge outlet 6 and the handwheel 40 assumes the position shown in broken lines in Fig. 1, operation of the lever 58 will cause lifting of the valve rod 12 to lift the valve body 14 from its seat and thus cause the valve body 14 to be freed from its stuck engagement with the gasket 30. Continued movement of the lever and the consequent elevation of the valve rod 12 will cause the upper end of the latter to contact with the hub 42 of the hand-wheel and thus lift the controller 20 to cause the valve guide 24 and the gasket 30 to be lifted from the discharge outlet 6.

After the contents of the tank have been discharged through the outlet 6 and it is desired to replace the valve in normal position, the lever 58 is swung to the position shown in Fig. 1 to cause the valve body 14 to seat on its valve seat 18 and then the hand-wheel 40 is rotated to cause elevation or lifting of the controller 20 to cause the guide 24 to compress the gasket 30 into sealing relation with the discharge outlet 6. Of course to permit operation of the lever, the latch 52 is moved from its lever retaining position to the position shown in dotted lines in Fig. 2 and after the valve has been reseated, the latch 52 is replaced in its normal position.

It is believed that the construction and operation of the device of the present invention will be fully apparent to those skilled in the art. It is to be understood that the drawings are for illustrative purposes only and various changes in the form and proportions of the construction illustrated may be made within the scope of the appended claims without departing from the spirit of the invention.

What is claimed is:

1. In a valve, a valve body for closing a discharge outlet, a valve rod for actuating the valve body, a valve guide in the discharge outlet adjacent the valve body but free of connection with said valve body, means on the valve body in cooperative relation with the valve guide adapted to restrain the valve guide against horizontal movement relative to the valve body but being of such character as to permit longitudinal movement of the valve guide relative to said valve body, a gasket interposed between the valve guide and valve body, and means for exerting pressure against the valve guide to shift the latter relative to the valve body in the direction of opening movement of the valve body to compress the gasket between said valve guide and valve body and into sealing relation with the discharge outlet.

2. In a valve, a valve body for closing a discharge outlet, a valve rod for actuating the valve body, a valve guide in the discharge outlet, a gasket interposed between said valve body and valve guide, supporting means for the valve guide including an actuating element having bearing on the valve rod and operative to shift the supporting means independently of the valve rod to cause the valve guide to shift relative to the valve body to compress the gasket or to relieve the gasket of compression dependent upon the direction of movement of said actuating element.

3. In a valve, a valve body for closing a discharge outlet, a valve rod for actuating the valve body, a valve guide in the discharge outlet, a gasket interposed between the valve body and valve guide, a supporting element for the valve guide having movement independently of said valve rod, and means for actuating the supporting element, said means having bearing on said valve rod and being operative to shift the valve guide relative to the valve body to exert pressure against the gasket whereby to compress the latter between the guide and valve body and into sealing relation with the discharge outlet.

4. In a valve, a valve body for closing a discharge outlet, a tubular valve rod for actuating the valve body, a valve guide in the discharge outlet, a gasket interposed between the valve body and valve guide, a valve guide supporting element positioned within the valve rod, actuating means for the said supporting element operative independently of the valve rod in one direction to shift the valve guide longitudinally relative to the valve body to compress the gasket into sealing relation with the discharge outlet and in the other direction to relieve the gasket of compression, and lever actuated means for shifting the valve body and valve guide relative to the discharge outlet.

5. Valve means comprising a valve body adapted to close a discharge outlet, a tubular valve rod secured to the valve body, a valve guide in the discharge outlet, a gasket interposed between the valve guide and valve body, a valve guide supporting element within the valve rod, cooperating means on the valve body and valve guide to restrain the latter against rotation relative to the body but adapted to permit relative longitudinal movement of the said valve guide and valve body, means on the supporting element having bearing on the valve rod and operable in one direction to effect shifting of the valve guide to compress the gasket into sealing relation with the discharge outlet and operable in the opposite direction to shift the valve guide to relieve the gasket of compression, and lever actuated rack and pinion means operable to shift said valve rod and supporting element to effect shifting of the valve body and valve guide relative to the discharge outlet.

6. Valve means comprising a valve body adapted to close a discharge outlet, a tubular valve rod secured to the valve body, a valve guide in the discharge outlet, a gasket interposed between the valve guide and valve body, a valve guide supporting element within the valve rod, cooperating means on the valve body and valve guide to restrain the latter against rotation relative to the body but adapted to permit relative longitudinal movement of the said valve guide and valve body, means on the supporting element having bearing on the valve rod and operable in one direction to effect shifting of the valve guide to compress the gasket into sealing relation with the discharge outlet and operable in the opposite direction on said supporting element out of its bearing relation with the valve rod in the event the gasket is stuck in its sealing relation, and lever actuated means connected to the valve rod for shifting said valve rod to first free the valve body from its stuck relation with the gasket and then to engage the before mentioned supporting element operating means to shift both the valve body and valve guide from the discharge outlet.

7. In combination with a valve and a valve rod, a valve guide, a gasket interposed between the valve and valve guide, a supporting element for the valve guide, means on the supporting element having bearing on the valve rod for supporting the supporting element, said means being operable to effect movement of the valve guide toward and away from the valve to respectively compress the gasket between the valve and valve guide and to relieve the gasket of compression.

8. In combination with a valve and a valve rod, a valve guide, a gasket interposed between the valve and valve guide, a supporting element for the valve guide, means on the supporting element having bearing on the valve rod for supporting the supporting element, said means being operable to effect movement of the valve guide toward and away from the valve to respectively compress the gasket btween the valve and valve guide and to relieve the gasket of compression, and rack and pinion means for shifting the valve and valve guide.

9. Means for controlling the flow through a discharge outlet comprising a multi-part valve having a gasket between the parts normally in sealing relation with the discharge outlet, a tubular valve rod connected to one of said parts, a supporting element for the other part positioned within the rod and operable independently of said rod to effect movement of one of said valve parts relative to the other whereby to break the sealing relation of the gasket with the discharge outlet, and lever actuated means for simultaneously shifting the parts of the valve.

10. In a valve, a valve body adapted to close a discharge outlet, a valve rod secured to the valve body; a valve guide normally in said outlet, a supporting element for the valve guide, means supported by the valve rod for actuating the supporting element to effect movement of the valve guide relative to the valve body, and rack and pinion means operable to simultaneously shift said valve body and valve guide.

11. In a valve, a valve body for closing a discharge outlet, a valve rod secured to the valve body, a bracket for guiding the valve rod in its movement, a valve guide in the discharge outlet, means on the valve body cooperating with said valve guide to restrain the said valve body and valve guide against relative horizontal movement but permitting relative longitudinal movement, a gasket interposed between the valve body and valve guide, supporting means for the valve guide including a member having bearing on said valve rod and operable to effect movement of the valve guide relative to the valve body in the direction of opening movement of the valve body to compress the gasket into sealing relation with the discharge outlet, and rack and pinion means operable to move said valve and valve guide relative to the discharge outlet.

12. In a valve, a valve body for closing a discharge outlet, a valve rod secured to the valve body, a bracket for guiding the valve rod in its movement, a valve guide in the discharge outlet, means on the valve body cooperating with said valve guide to restrain the said valve body and valve guide against relative horizontal movement but permitting relative longitudinal movement, a gasket interposed between the valve body and valve guide, supporting means for the valve guide including a member having bearing on said valve rod and operable to effect movement of the valve guide relative to the valve body in the direction of opening movement of the valve body to compress the gasket into sealing relation with the discharge outlet, a rack connected with the valve rod, a pinion meshing with said rack and supported by the bracket, and a lever for actuating said pinion to shift the valve rod and the valve body and valve guide relative to the discharge outlet.

13. In a valve, a valve body for closing a discharge outlet, a valve rod secured to the valve body, a bracket for guiding the valve rod in its movement, a valve guide in the discharge outlet, means on the valve body cooperating with said valve guide to restrain the said valve body and valve guide against relative horizontal movement but permitting relative longitudinal movement, a gasket interposed between the valve body and valve guide, supporting means for the valve guide including a member having bearing on said valve rod and operable to effect movement of the valve guide relative to the valve body in the direction of opening movement of the valve body to compress the gasket into sealing relation with the discharge outlet, a rack connected with the valve rod, a pinion meshing with said rack and supported by the bracket, a lever for actuating said pinion to shift the valve rod and the valve body and valve guide relative to the discharge outlet, and a latching element supported by said bracket and adapted to engage the lever to restrain the latter against accidental movement.

In witness whereof I have hereunto set my hand.

EDWARD M. HARTMAN.